United States Patent
Levesque

(10) Patent No.: US 9,886,829 B2
(45) Date of Patent: Feb. 6, 2018

(54) SYSTEMS AND METHODS FOR CLOSED-LOOP CONTROL FOR HAPTIC FEEDBACK

(71) Applicant: Immersion Corporation, San Jose, CA (US)

(72) Inventor: Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 32 days.

(21) Appl. No.: 15/186,727

(22) Filed: Jun. 20, 2016

(65) Prior Publication Data

US 2017/0365139 A1 Dec. 21, 2017

(51) Int. Cl.
 *G08B 6/00* (2006.01)
 *G06F 3/044* (2006.01)
 *G06F 3/01* (2006.01)

(52) U.S. Cl.
 CPC ............. *G08B 6/00* (2013.01); *G06F 3/016* (2013.01)

(58) Field of Classification Search
 None
 See application file for complete search history.

(56) References Cited

U.S. PATENT DOCUMENTS

| | | | |
|---|---|---|---|
| 7,808,488 B2 * | 10/2010 | Martin | G06F 1/1662 345/156 |
| 8,941,475 B2 | 1/2015 | Makinen et al. | |
| 9,195,350 B2 * | 11/2015 | Radivojevic | G06F 3/044 |
| 9,330,544 B2 * | 5/2016 | Levesque | G08B 6/00 |
| 2010/0123588 A1 | 5/2010 | Cruz et al. | |
| 2013/0106589 A1 | 5/2013 | Posamentier | |
| 2014/0104165 A1 * | 4/2014 | Birnbaum | G06F 3/016 345/156 |

(Continued)

FOREIGN PATENT DOCUMENTS

EP 2778843 9/2014

OTHER PUBLICATIONS

Nakamura, Taku et al.; "Multi-Finger Surface Visuo-Haptic Rendering Using Electrostatic Stimulation with Force-Direction Sensing Gloves"; IEEE Haptics Symposium 2014; Feb. 23-26, 2014; pp. 489-491; Houston, TX.

(Continued)

*Primary Examiner* — Joseph Feild
*Assistant Examiner* — John Mortell
(74) *Attorney, Agent, or Firm* — Kilpatrick Townsend & Stockton LLP

(57) ABSTRACT

Example systems and methods for closed-loop control for haptic feedback are disclosed. One example method includes the steps of outputting a first signal configured to cause a haptic output device to output a haptic effect to a surface; determining one or more first velocities of a surface of an object attracted towards the surface in response to the haptic effect; in response to the first velocities decreasing to approximately zero, discontinuing output of the first signal; determining one or more second velocities of a surface of an object rebounding away from the surface in response to the discontinuing output of the first signal; in response to the second velocities decreasing to approximately zero, determining a responsiveness of the surface of the object to the haptic effect; and outputting a second signal based on the responsiveness.

24 Claims, 12 Drawing Sheets

(56) References Cited

U.S. PATENT DOCUMENTS

| | | | |
|---|---|---|---|
| 2014/0139450 A1* | 5/2014 | Levesque | G08B 6/00 345/173 |
| 2014/0267076 A1* | 9/2014 | Birnbaum | B25J 13/025 345/173 |
| 2015/0145657 A1* | 5/2015 | Levesque | G06F 3/016 340/407.2 |
| 2016/0004309 A1* | 1/2016 | Modarres | G06F 3/016 345/173 |
| 2016/0195931 A1* | 7/2016 | Czelnik | G06F 3/016 345/173 |
| 2017/0168630 A1* | 6/2017 | Khoshkava | G06F 1/163 |
| 2017/0178470 A1* | 6/2017 | Khoshkava | G06F 3/016 |
| 2017/0280397 A1* | 9/2017 | Da Costa | G06F 1/3287 |

OTHER PUBLICATIONS

EP17275088.7, "Extended European Search Report", dated Nov. 15, 2017, 9 pages.

* cited by examiner

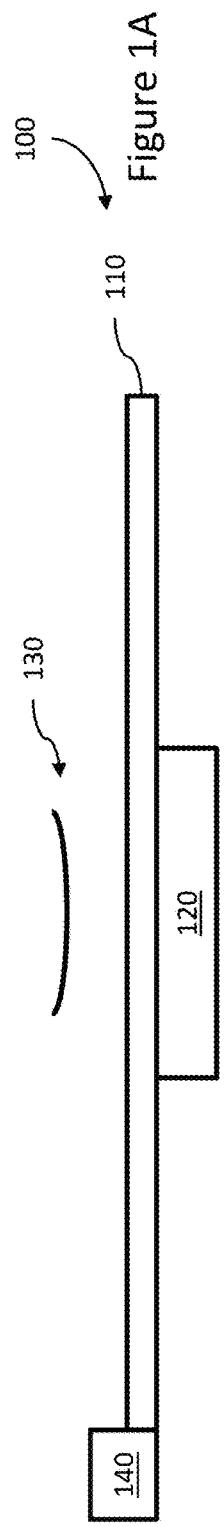
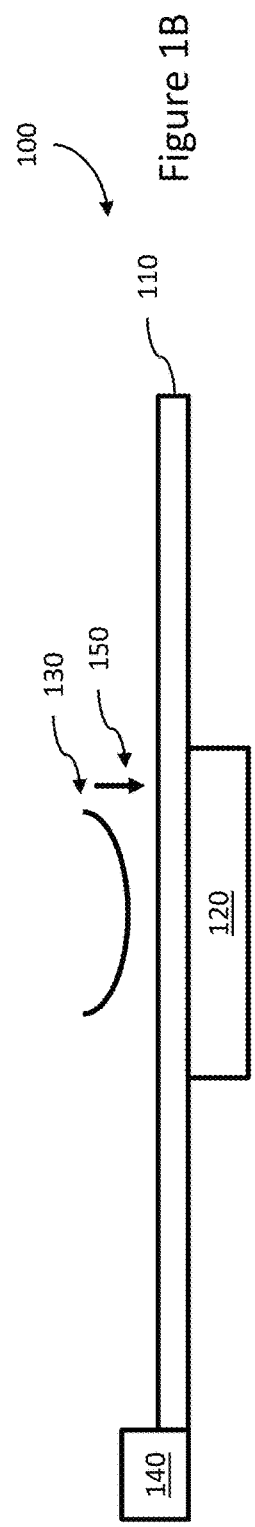
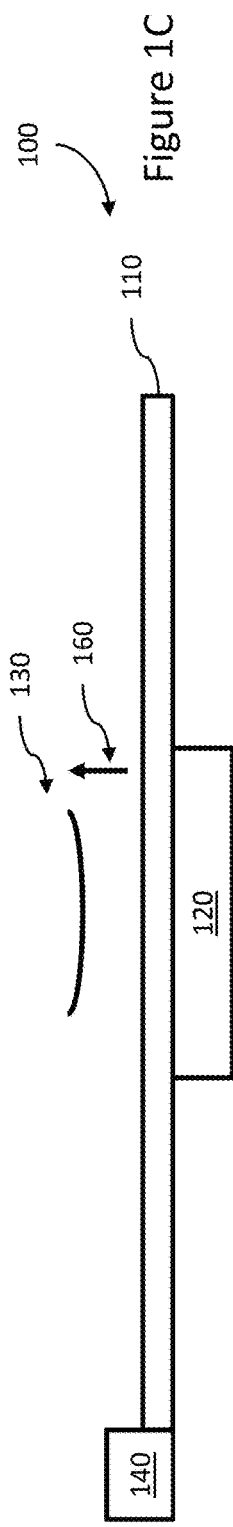

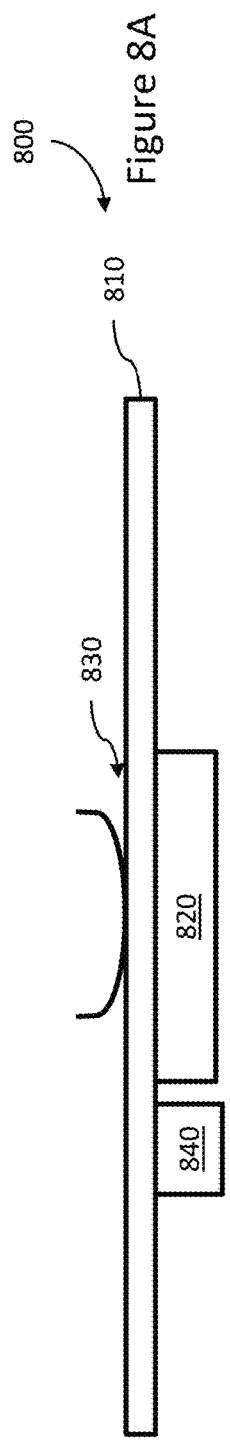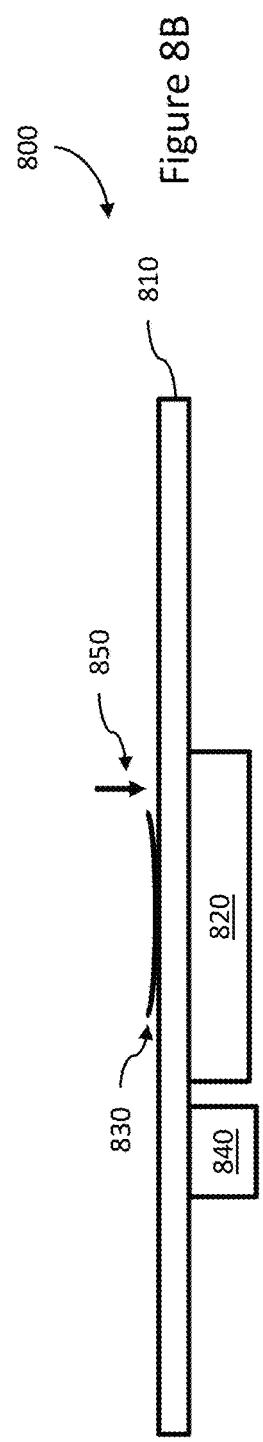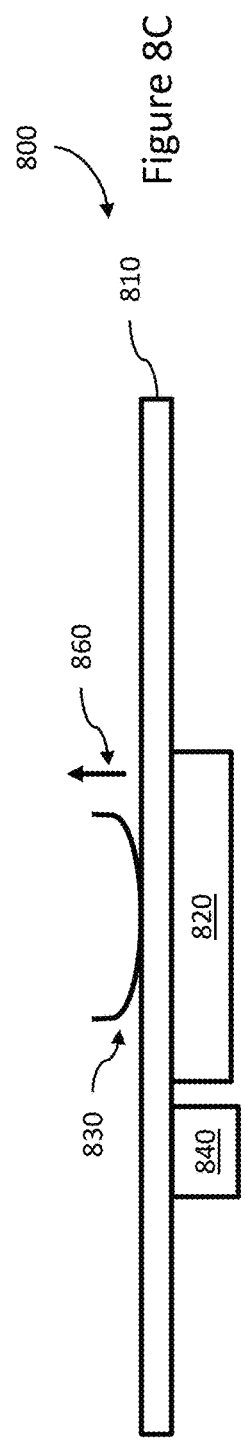

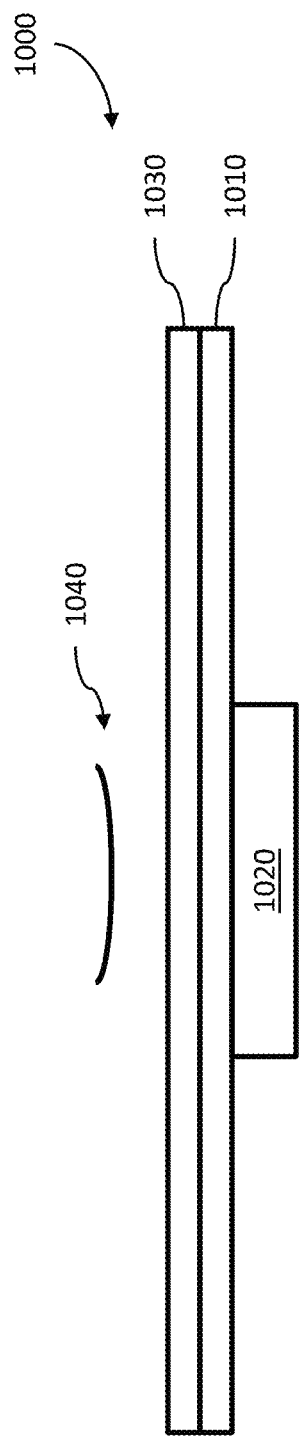

SYSTEMS AND METHODS FOR CLOSED-LOOP CONTROL FOR HAPTIC FEEDBACK

FIELD

The present application relates generally to haptic feedback and more specifically relates to systems and methods for closed-loop control for haptic feedback.

BACKGROUND

Many user devices, such as smartphones, include haptic capabilities. For example, a conventional beeper may include an eccentric-rotating mass powered by a battery that can generate vibrational effects when activated. Other types of haptic devices may be incorporated as well, such as electrostatic friction haptic output devices. ESF devices generate high voltage static fields, e.g., 2 kilovolts (kV), on a surface, which can attract, for example, the skin on a user's finger towards the surface.

SUMMARY

Various examples are described for systems and methods for closed-loop control for haptic feedback. One example disclosed method includes the steps of outputting a first signal configured to cause a haptic output device to output a haptic effect to a surface; determining one or more first characteristics of a surface of an object responding to the haptic effect; in response to the first characteristics reaching a first threshold, discontinuing output of the first signal; determining one or more second characteristics of the surface of the object responding to the discontinuing output of the first signal; in response to the second characteristics reaching a second threshold, determining a responsiveness of the surface of the object to the haptic effect; and outputting a second signal based on the responsiveness, the second signal configured to cause the haptic output device to output a second haptic effect to the surface.

One example device includes a surface; a sensor; a haptic output device in communication with the surface; a processor in communication with the output device and the sensor, the processor configured to: output a first signal to the output device, the first signal configured to cause the haptic output device to output a haptic effect to the surface; determine first characteristics of a surface of an object responding to the haptic effect based on one or more first sensor signals received from the sensor; in response to the first characteristics reaching a first threshold, discontinue output of the first signal; determine second characteristics of a surface of an object responding to the discontinuing of the first signal based on one or more second sensor signals received from the sensor; in response to the second characteristics reaching a second threshold, determine a responsiveness of the surface of the object to the haptic effect; adjust a haptic effect parameter based on the responsiveness; and output a second signal based on the responsiveness, the second signal configured to cause the haptic output device to output a second haptic effect to the surface.

One example non-transitory computer-readable medium includes processor-executable program code, wherein the program code is configured to cause a processor to output a first signal to a output device, the first signal configured to cause the output device to output a haptic effect to a surface; determine one or more first characteristics of a surface of an object responding to the haptic effect; in response to the first characteristics reaching a first threshold, discontinue output of the first signal; determine one or more second characteristics of a surface of an object responding to the discontinuing of the first signal; in response to the second characteristics reaching a second threshold, determine a responsiveness of the surface of the object to the haptic effect; adjust a haptic effect parameter based on the responsiveness; and output a second signal based on the responsiveness, the second signal configured to cause the haptic output device to output a second haptic effect to the surface.

These illustrative examples are mentioned not to limit or define the scope of this disclosure, but rather to provide examples to aid understanding thereof. Illustrative examples are discussed in the detailed description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 1A-1C show an example system for closed-loop control for haptic feedback according to this disclosure;

FIGS. 8A-8C show an example system for closed-loop control for haptic feedback according to this disclosure; and FIGS. 9A-10 show example systems for closed-loop control for haptic feedback according to this disclosure.

DETAILED DESCRIPTION

Figure 2:
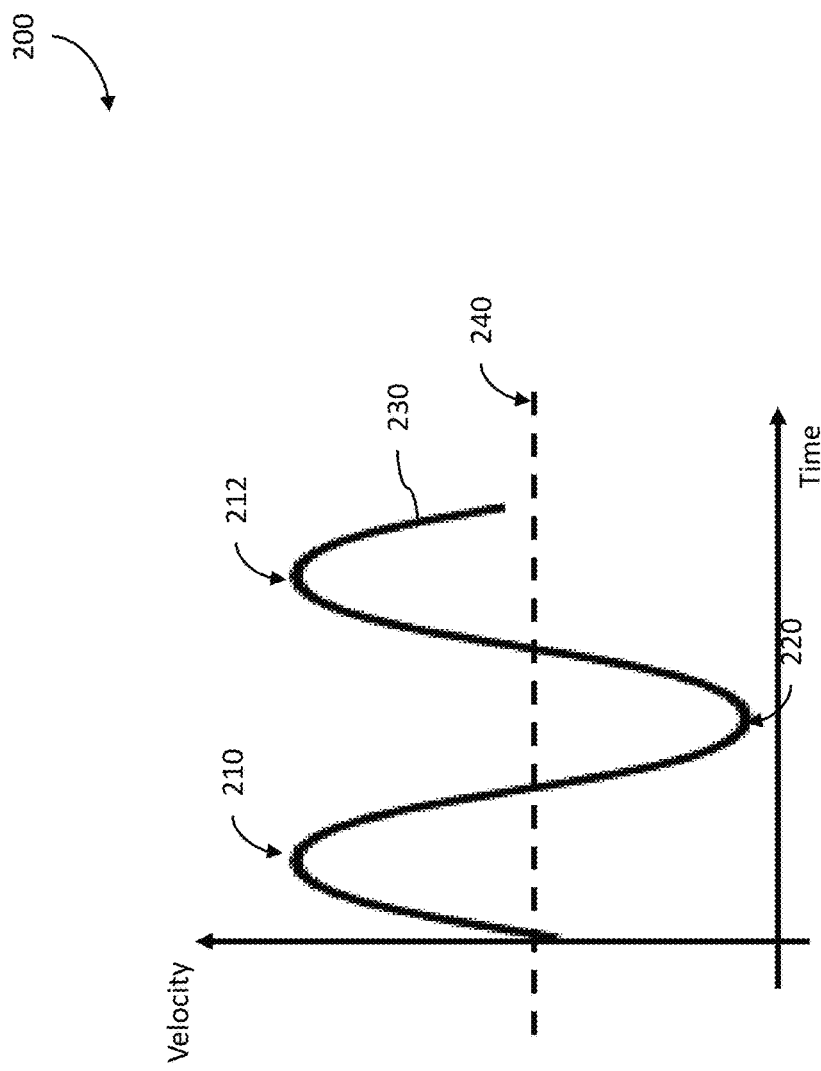
FIG. 2 shows an example plot of a velocity of a surface of an object over a period of time.

Examples are described herein in the context of systems and methods for closed-loop control for haptic feedback. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example Method for Closed-Loop Control for Haptic Feedback

In an illustrative example, a user touches her fingertip to a location on the smartphone, which captures her fingerprint and automatically unlocks the smartphone and activates a user profile on the phone. The user then begins to use her smartphone, which is equipped with an electro-static force-generating ("ESF") haptic output device that can apply ESF-based haptic feedback to the surface of the smartphone's display. As the user uses the smartphone, different applications cause the ESF haptic output device to output various ESF haptic effects to provide haptic feedback. However, as the smartphone outputs the ESF effects, it monitors the motion of the skin on the user's fingertip as the effects are applied to determine the skin's responsiveness to the various ESF effects. For example, the smartphone may output an ESF haptic effect that involves sending a square wave drive signal to the ESF haptic output device. While outputting the effect, the smartphone captures images of the movement of skin on the user's fingertip using a small camera positioned at the top of the smartphone and oriented to capture images along the surface of the display. Thus, the smartphone is able to capture a succession of images a side view of the user's fingertip as the effect is applied. From the captured images, the smartphone is able to determine how quickly the skin on the user's fingertip responds to the applied ESF haptic effect.

After capturing the images, and while the haptic effect is being output, the smartphone determines that haptic effect produced by the square wave does not allow the skin to return to its rest position, e.g., while the square wave was outputting a "0" to the ESF haptic output device, before attracting the skin of the fingertip towards the surface again. Thus, the smartphone determines that the period of the square wave is too short and the haptic effect felt by the user is not optimal. The smartphone then reduces the frequency of the square wave and captures additional images to determine whether the frequency of the square wave should be further tuned to provide a stronger haptic effect.

As the smartphone continues to tune the square wave, it develops a model of the user's skin that can be re-used when haptic effects are output again in the future. The model, in this illustrative example, includes information about a resonant frequency of the skin on the fingertip as well as frequency response information, such as gain information, for other frequencies, and associates the model with the user's profile on the smartphone.

At a later time, the user interacts with an application that provides different intensities of ESF effects. To generate appropriate signals to drive the ESF haptic output device, the application accesses the user's profile to obtain the model of the user's skin to identify optimal frequencies at which to output the ESF haptic effect and generates the drive signal based on the model. For example, to output the strongest possible effect, the application may identify a resonant frequency of the user's skin and generate a drive signal to output an ESF haptic effect at that frequency. However, to output a milder effect, the application may instead select a frequency that corresponds to a poor frequency response of the user's skin. Further, in some examples, determinations of characteristics of a particular object may be used in conjunction with one or more tables providing data indicating a correspondence between one or more perception thresholds for a particular applied effect and one or more frequencies at which the effect may be applied.

Such an example illustrates closed-loop control for haptic feedback. This illustrative example is not intended to be in any way limiting, but instead is intended to provide an introduction to the subject matter of the present application. Other examples of closed-loop control for haptic feedback are described below.

Referring now to FIGS. 1A-1C, FIGS. 1A-1C show an example system 100 for closed-loop control for haptic feedback according to this disclosure. The system 100 is shown in cross-section and with a simulated surface (skin) 130 of a user's fingertip. The system shown in FIGS. 1A-1C includes a surface 110, an haptic output device 120, and a sensor 140. In this example, the haptic output device 120 comprises an ESF haptic output device, and the sensor 140 comprises an image sensor oriented to capture an image along the surface 110 of the skin 130 of the user's fingertip as it deforms in response to an ESF effect. In some examples, the sensor 140 may comprise a plurality of infrared sensors arranged in one or more rows and oriented to sense infrared emissions above the surface 110 from the skin 130 of the user's fingertip. By using multiple rows of such sensors at different elevations, movement of the skin 130 of the user's fingertip may be sensed. Still other types of sensors may be employed, such as event-based cameras. It should be noted that while in this example, the haptic output device comprises an ESF haptic output device, other types of haptic output devices may be employed. For example, suitable haptic output devices may include ultrasound haptic output devices, haptic output devices that output one or more puffs of air, etc. Such haptic output devices may operate by pushing against a surface of an object (e.g., the skin on a user's fingertip), rather than attracting the surface of the object. However, example methods, devices, and systems according to this disclosure could be adapted to accommodate repulsive forces rather than attractive forces, such as by reversing the sign of one or more quantities or reversing one or more test conditions according to various examples.

It should be noted that when used in the specification, the term "non-contact" or "non-contact-based" refers to forces that may be applied while an object, e.g., a fingertip, is not contacting a surface, e.g., the surface 110 shown in FIG. 1. However, this does not preclude contact between the object and the surface. For example, haptic effects may still be applied to a fingertip in contact with the surface, and may still be felt by the user, or examples according to this disclosure may result in contact between the object and the surface. Examples according to this disclosure may be operative both when the object is in contact with the surface and when it is not, though different sensors may be employed or different portions of the surface of the object may be sensed based on whether the surface of the object is in contact with the surface or not. For example, a pressure sensor may be employed to detect responsiveness of the surface of the object when in contact with the surface, or an image sensor may only monitor characteristics or portions of the surface of the object that are not in contact with the surface. Still further examples may be discerned from a close examination of this disclosure.

FIG. 1A shows the system 100 at rest while the ESF haptic output device 120 is not outputting an ESF effect. As can be seen, the skin 130 on the user's fingertip is at rest. In FIG. 1B, the ESF haptic output device 120 is energized and is outputting an ESF effect, which attracts the skin 130 on the fingertip towards the surface 110, as indicated by the arrow 150. As the skin 130 on the fingertip is attracted towards the surface, the skin 130 stretches until it reaches a maximum amount of stretch (or displacement from rest). At a later time, illustrated in FIG. 1C, the ESF haptic output device 120 ceases outputting the ESF effect and the skin 130 on the fingertip 130 returns to its rest position, as indicated by arrow 160.

FIG. 2 illustrates a graph showing the velocity of skin 130 on the fingertip as it is cyclically attracted towards the surface 110 and allowed to return to its rest position over time. As can be seen, the velocity increases from 0 (indicated by dashed line 240) to a maximum velocity 210 as the skin stretches towards the surface 110. As the skin reaches its maximum displacement, the velocity will decrease to zero. If the ESF effect is discontinued at this time, the skin will begin to rebound towards its rest position and the velocity will increase to a maximum velocity and then decrease towards zero as it returns to a rest position. Thus, by determining velocities of the skin 130 while ESF effects are applied and discontinued, and in particular the time between when the velocities cross zero (indicating, e.g., maximum or minimum displacement), characteristics of the user's skin 130 may be determined and used to tune ESF haptic effects.

It should be appreciated that the rest position and the maximum displacement may include some overshoot as the skin responds to various ESF effects, thus velocities may provide a way to avoid using exact rest positions or maximum displacement positions to determine the skin's response. However, the graph shown in FIG. 2 could instead illustrate displacement versus time, acceleration versus time, etc. In either case, maximum or minimum values of displacement or acceleration may provide information usable in various examples according to this disclosure rather than, or in addition to, zero velocity.

Figure 3:
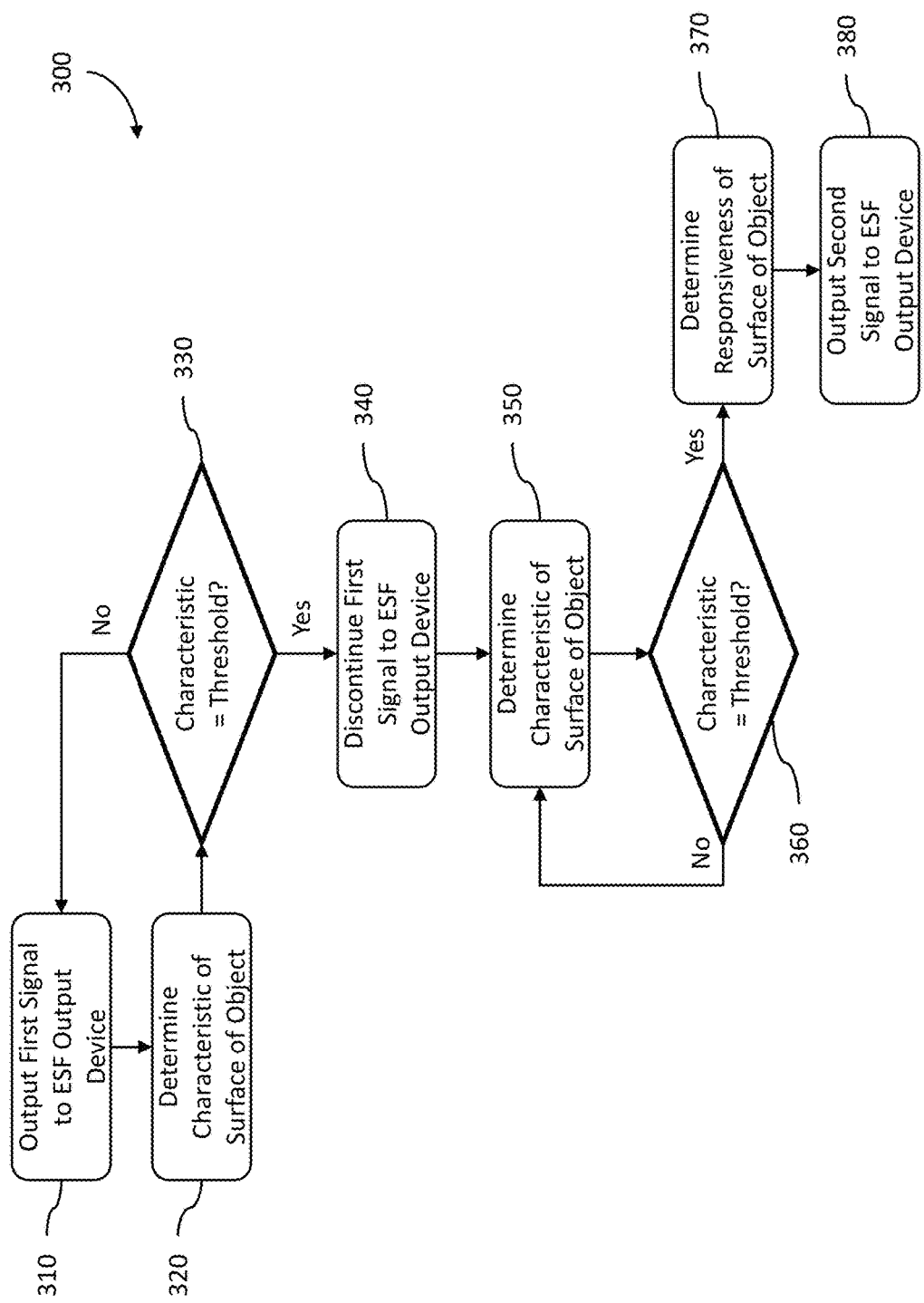
FIG. 3 shows an example method for closed-loop control for haptic feedback according to this disclosure.

Referring now to FIG. 3, FIG. 3 shows an example method for closed-loop control for haptic feedback. The method 300 of FIG. 3 will be discussed with respect to the system 100 of FIG. 1 and with respect to ESF haptic effects, though any other haptic effect may be used in other examples. In addition, it should be noted that other suitable systems or devices according to this disclosure may be used as well, such as those shown in FIGS. 9A-10 and described in detail below.

Figure 4:
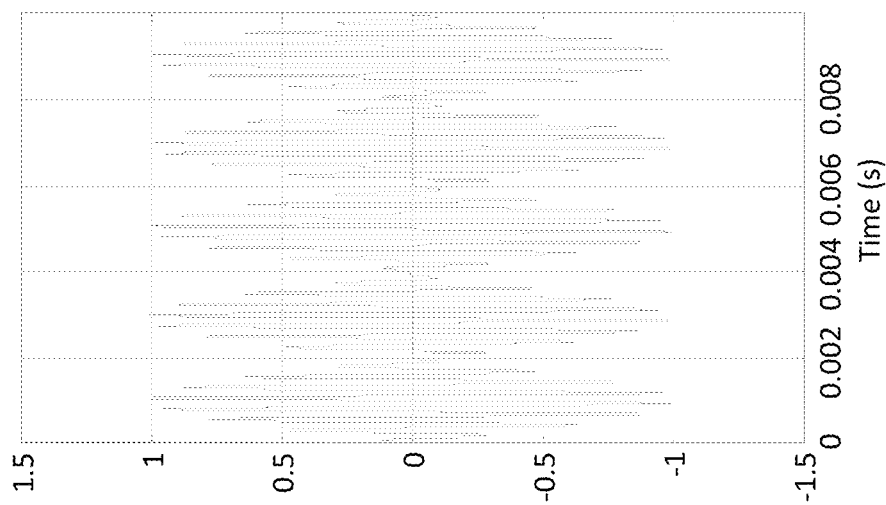
FIGS. 4-5E show example signals for outputting an ESF haptic effect.
Figure 5A:
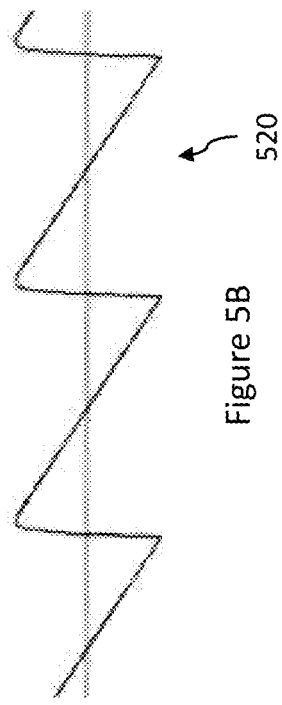
Figure 5B:
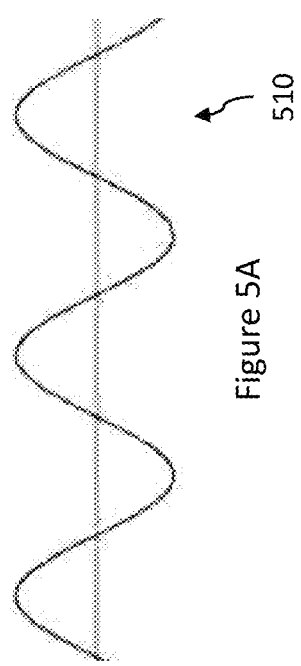
Figure 5C:
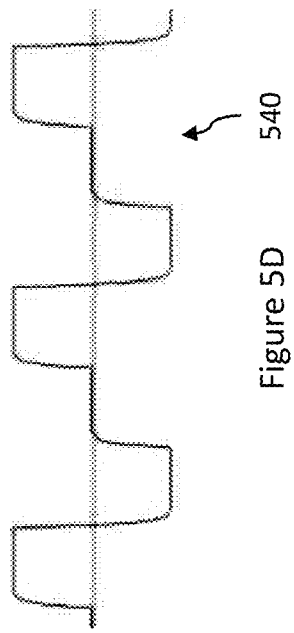
Figure 5D:
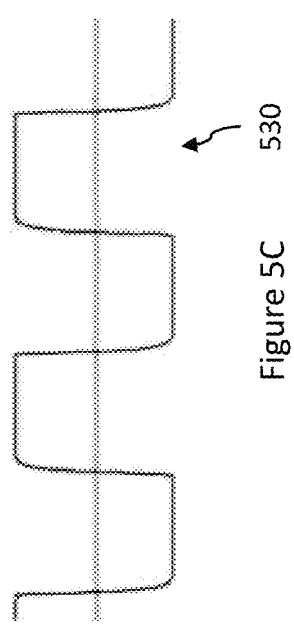
Figure 5E:
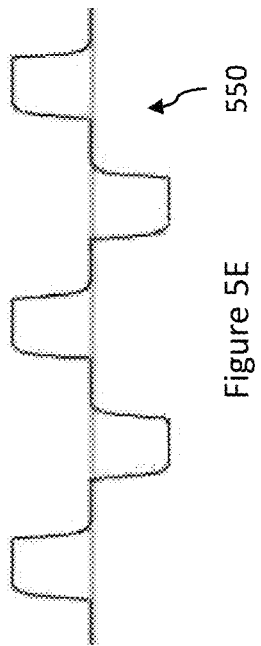

The method 300 of FIG. 3 begins in block 310 when a processor outputs a first signal to the ESF haptic output device to cause the ESF output device to output an ESF effect to the surface 110. In this example, the first signal comprises a direct current (DC) drive signal. In some examples, however, a drive signal may comprise other characteristics. For example, a drive signal may comprise an alternating current (AC) drive signal having a frequency in the range of approximately 10 to 1000 Hz (+/−1%). In some examples, higher frequency AC signals may be output, such as having frequencies up to 1 MHz or greater, according to an envelope that varies the magnitude at a lower frequency. For example, an AC signal having a frequency of 5 kHz and a magnitude that varies according to an envelope having a frequency of 500 Hz, as may be seen in FIG. 4. And while the example shown in FIG. 4 comprise sinusoidal waveforms, other suitable waveforms may be employed. For example, FIGS. 5A-E shows examples of other drive signals that may be employed, including sinusoidal waves 510, sawtooth waves 520, square waves 530, step-up square waves 540, and step-up/step-down square waves 550 Still other types of periodic or aperiodic waveforms may be employed in some examples according to this disclosure.

At block 320, the processor determines a characteristic of the surface of an object 130 positioned above the surface 110. In this example, the object 130 is a human fingertip, and the surface of the object 130 is the skin on the fingertip. As discussed above, when an ESF output device 120 is energized, it may draw the skin towards the surface, and when the ESF output device 120 is de-energized, the skin may rebound to its resting position. For example, as the skin moves towards the surface, its velocity will increase and then decrease to zero as the skin reaches a point of maximum stretch, based on the force output by the ESF output device 120.

As the skin moves, a sensor detects the movement of the skin and provides sensor signals to the processor. The processor determines the characteristic, e.g., the velocity, of the skin at successive times and determines when the characteristic reaches a threshold value. For example, if the processor determines the skin's velocity at successive times, it may set a threshold at zero and determine approximately when the skin's velocity reaches zero, e.g., at the point of maximum stretch. In some examples, the processor may determine a characteristic based on differences between successive sensor signals. In one example, the sensor comprises a camera oriented to capture images along the plane of the surface 110, and thus may directly observe, for example, the amount the skin has stretched. By determining differences in a gap between the skin and the surface, the processor may determine a velocity, such as in millimeters (mm) per second. In some examples, the processor may not determine an absolute velocity (e.g., mm/second), but may instead, determine a velocity based on a difference in the number of scan lines having captured the skin in successive images. Further, because images may be taken at discrete times, the point of maximum stretch may not be captured in an image, but may be determined based on interpolation techniques, such as linear interpolation, polynomial interpolation, or spline interpolation, between two or more successive images. In some examples, rather than interpolating to determine an approximate time at which the velocity reached zero, the system may determine a sign change in a velocity (or other characteristic) and use that as a proxy for determining that a zero crossing had occurred.

In some examples, other types of sensors may be employed. For example proximity sensors, such as capacitive sensors, ultrasound sensors, or other range sensors may be employed. In some such examples, the processor may receive successive sensor signals indicative of a velocity, a position, an acceleration, or other characteristic of the skin. The processor may then determine one or more velocities of the skin. Further, for each of these techniques, one or more interpolation techniques may be employed to determine characteristics of the surface of the object at times without information from a corresponding sensor signal.

As discussed above, it should be appreciated that the rest position and the maximum displacement may include some overshoot as the skin responds to various ESF effects, thus different characteristics may provide a way to avoid using exact rest positions or maximum displacement positions to determine the skin's response. However, in some examples, characteristics of the skin other than velocity may be employed. For example, the processor may instead (or in addition) determine a displacement or an acceleration of the skin. For example, some sensors may provide signals better suited to determining a position or an acceleration, or in some examples, it may be less computationally expensive to determine a position or an acceleration. In some such examples, maximum or minimum values of displacement or acceleration may provide information usable in various examples according to this disclosure rather than, or in addition to, velocity information.

In some examples, the processor may determine multiple characteristics of the surface of the object 130. For example, the processor may determine a displacement of the surface of the object as well as a velocity, or an acceleration or changes in velocity over time as the surface of the object 130 moves towards the surface 110.

While the examples above have been discussed in the context of assuming a surface moves uniformly, other examples may measure movements of the surface of the object at two or more locations. For example, skin on a user's fingertip may accelerate or move at different rates based on anatomical variations throughout the fingertip. Thus, a sensor may measure multiple locations on the fingertip to determine a response of the skin to the applied effect. For example, the system 100 may measure the velocity of multiple locations on the fingertip and determine velocities or other characteristics at each point.

It should be noted that a surface of the object may move in response to an applied effect, but may also move due to movement of the object itself, e.g., a user moves her fingertip. In some examples, sensor information may be filtered to filter out slow movements, which are likely indicative of the object itself moving, and identifying movements above a threshold. For example, skin on a user's fingertip will move at relatively high velocities in response to an ESF effect, e.g., when vibrating in the 100-1000 Hz range, while the fingertip may move much more slowly as the user attempts to hold their finger over the surface. In some examples, rather than filtering (or in addition to filtering), one or more separate sensors may be used to detect gross movement of the object itself, such as one or more proximity sensors.

At block 330, the processor determines whether the characteristic of the skin has reached a threshold. If not, the method 300 returns to block 310. If the characteristic has reached the threshold, the method proceeds to block 340. It should be noted that a threshold may be defined by a value, or a range of values, or it may be defined as any other value or condition, such as by a change in sign of a determined characteristics (e.g., velocity), or a characteristic reaching a maximum or minimum value, e.g., the continued application of the effect results in no further change in the characteristic over time.

As discussed above, the processor may employ techniques such as interpolation techniques discussed above to determine when a velocity reaches zero, thus, a measured velocity may not be zero, however, the velocity may have been zero during the most recent iteration, such as between two or more successive images or two or more successive sensor signals, which may cause the method to proceed to block 340.

Further, as discussed above, in some examples, a sensor (or multiple sensors) may sense information about multiple locations on the surface of the object. In some examples, the system 100 may determine when the velocity of each location reaches zero, or when two or more locations reach zero within a threshold time of each other (e.g., 0.001 seconds).

At block 340, the processor discontinues the outputting the first signal to the ESF output device. As discussed above, the processor may directly provide a drive signal to the ESF output device. In some such examples, the processor may halt outputting the drive signal. In some examples, however, the processor may control an enable signal or other signal configured to cause another component to generate, output, or allow the first signal to be transmitted to the ESF output device.

At block 350, the processor again determines the characteristic of the surface of the object according to the techniques above; however, at block 350, the surface of the object, for example, may be rebounding to a rest position in response to the discontinuing of the outputting of the first signal. Thus, the characteristics may be determined as having negative values in some examples.

At block 360, the processor determines whether the characteristic of the skin has reached a second threshold as discussed above with respect to block 330. In this example, a second threshold may correspond to a rest state of the surface of the object, or it may be defined as any other value or condition, such as discussed above. If the threshold has not been reached, the method 300 returns to block 350. Otherwise, the method 300 proceeds to block 370.

At block 370, the processor determines a responsiveness of the surface of the object 130. For example, the processor may determine a time between outputting the first signal and a time at which the velocity of the surface of the object 130 reached zero, such as at the point of maximum stretch, to determine a stretch time, and the time between discontinuing outputting the first signal and the time at which the velocity of the surface of the object 130 reached zero to determine a rebound time. In some examples, the method may return to block 310 to obtain additional data points to determine a more accurate responsiveness of the surface of the object 130. For example, the method may iterate a predetermined number of times, or it may iterate until a statistical analysis, e.g., a standard deviation, of the data indicates sufficient data has been gathered, or a variation in determinations over multiple iterations is very small, e.g., less than 5%.

At block 380, the processor outputs a second signal to cause the ESF output device to output an ESF effect, the second signal based on the determined responsiveness. After the processor determines a responsiveness of the surface of the object 130, the processor may then determine one or more suitable waveforms for generating a new signal for causing an ESF effect. For example, the processor may determine a desirable frequency for a drive signal for an ESF output device by determining a period from the stretch time and the rebound time. For example, if the stretch time is 0.0022 seconds and the rebound time is 0.0029 seconds, the processor may determine a frequency of 196.1 Hz as a desirable ESF haptic effect by adding the stretch and rebound time to obtain a period for a sine wave. In some examples, the processor may instead generate an asymmetric square wave based on different stretch and rebound times. For example, a signal may be generated that has a period of 0.0051 seconds based on the example stretch and rebound times above, but has an "on" time of 0.0022 seconds and an "off" time of 0.0029 seconds. In some examples a periodic waveform may be generated based on the ratio between the stretch time and rebound time. In some examples, a signal generator may comprise a pulse width modulator, which may output a pulse-width modulated signal based on such a determined ratio.

It should be noted that the method 300 of FIG. 3 may be performed iteratively, such as to apply an ESF effect with a greater or lesser magnitude to determine the impact of such changes in magnitude on responsiveness of the surface of the object. In addition, the method 300 of FIG. 3 may be employed with other types of haptic output devices, such as ultrasound-based haptic output devices, haptic output devices that output one or more puffs of air, etc.

Figure 6:
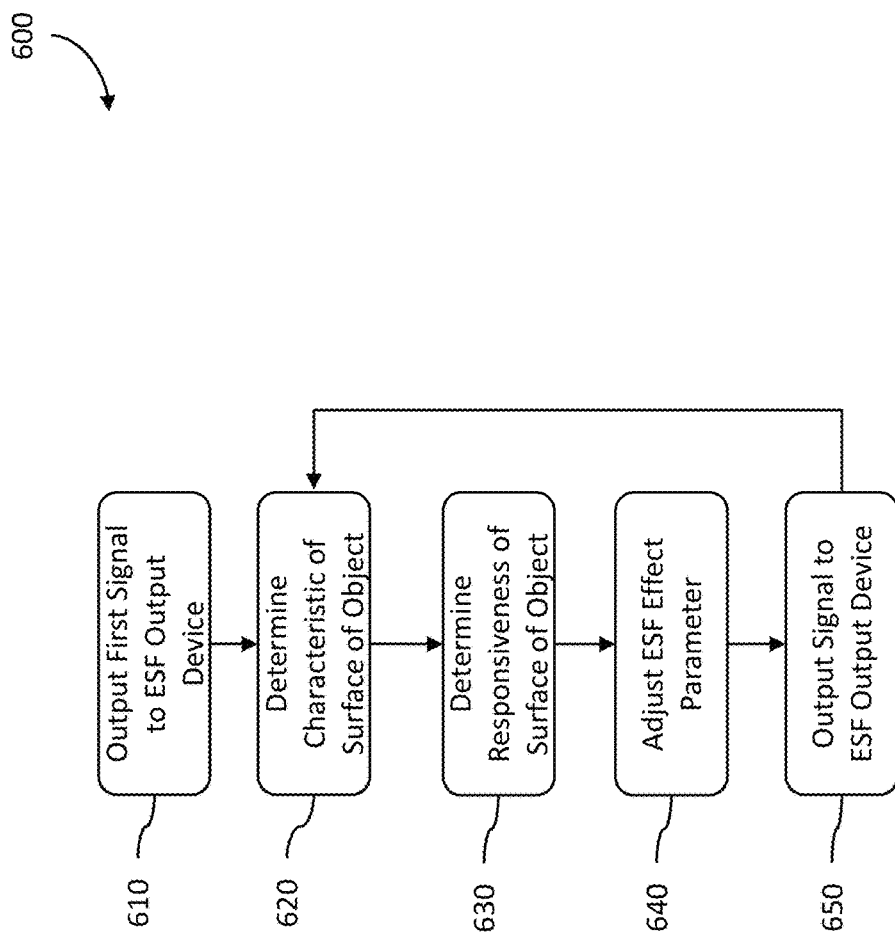
FIG. 6 shows an example method for closed-loop control for haptic feedback according to this disclosure.

Referring now to FIG. 6, FIG. 6 shows an example method for closed-loop control for haptic feedback. The method 600 of FIG. 6 will be discussed with respect to the system of FIG. 1 and with respect to ESF haptic effects, though any other haptic effect may be used in other examples. In addition, it should be noted that other suitable systems or devices according to this disclosure may be used as well, such as those shown in FIGS. 9A-10 and described in detail below.

The method 600 of FIG. 6 begins in block 610 when a processor outputs a first signal to the ESF haptic output device to cause the ESF output device to output an ESF effect to the surface 110. Different examples of techniques for outputting signals are discussed above with respect to block 310 of the method 300 of FIG. 3. In this example, the first signal is a predetermined haptic effect based on a generic characterization of skin on a fingertip. In some examples, however, the first signal may comprise a first signal of a frequency sweep. For example, the system 100 may attempt to determine resonant frequency characteristics of a user's fingertip and may select a start frequency and an end frequency, and at block 610. In one such example, the first signal may be based on the start frequency.

At block 620, the system 100 determines a characteristic of the surface of the object while the ESF effect is output. In one example, the sensor comprises a camera oriented to capture images along the plane of the surface 110, and thus may directly observe an amount the skin has stretched. The camera captures images of the fingertip and, for example, a range of displacement is determined based on the minimum and maximum displacements (or velocities, accelerations, etc.) of the skin on the fingertip as the ESF effect is applied. Thus, the system 100 may determine a perceived intensity of the ESF effect. For example, data obtained from the method 300 of FIG. 3 may provide information regarding minimum and maximum displacements of the skin on the fingertip, which may be used to determine a perceived intensity of the ESF effect, such as based on a percentage of the determined ranges of motion.

In some examples, rather than hovering above a surface, an object may be in contact with the surface 110. For example, FIG. 8A illustrates an example object 830 in contact with a surface 810. A pressure sensor 840 is coupled to the surface 810 and configured to sense a pressure of a contact with the surface 810, such as by the contact between the object 830 and the surface 810. However, because the object 830 is in contact with the surface, a pressure between the object 830 and the surface 810 may change based on the applied ESF effect. For example, FIG. 8B illustrates that, in response to the haptic effect output by a haptic output device 820, the surface of the object 830 deforms as it is attracted 850 towards the surface 810. Thus, a pressure applied to the surface 810 by the object 830 may change based on the applied haptic effect. The pressure sensor detects the changes in pressure and provides one or more sensor signals to a processor. As may be seen in FIG. 8C, the object 830 returns 860 to its initial or at-rest state and corresponding pressure.

While the examples above determines a range of displacements or pressures, other examples may determine other characteristics of the surface of the object as the ESF effect is applied. For example, maximum and minimum velocities or maximum and minimum accelerations, or maximum or minimum rates of change of pressures or pseudo-pressures may be determined. Such characteristics may also provide information characterizing a perceived intensity of the applied ESF effect. For example, high maximum velocities or accelerations may be indicative of high intensity effects. It should be noted that maximum and minimum velocities may refer to positive and negative velocities and accelerations based on the selected coordinate system, or may reference only maximum velocities if only magnitude is employed.

At block 630, the system 100 determines a responsiveness of the surface of the object to the ESF effect based on the determined characteristic(s). As discussed above with respect to block 370 of the method 300 of FIG. 3. In some examples, maximum and minimum displacements, pressures, or pseudo-pressures (or velocities, accelerations, rates of change of pressure, etc.) that were previously determined may be compared against the determined range of displacement, pressure, or pseudo-pressure (or velocities, accelerations, rates of change of pressure, etc.) to determine a responsiveness of the surface of the object to the particular ESF effect.

At block 640, the system 100 adjusts an ESF effect parameter based on the determined responsiveness of the surface of the object to the ESF effect. For example, the system may determine that a frequency of the ESF effect should be changed to elicit a more forceful reaction of the surface of the object to the ESF effect. For example, if measurements regarding the time taken for the surface of the object to move from a rest position to a position of maximum stretch and to return to rest indicate a period greater than the period of the ESF effect, the period of the ESF effect may be increased, thereby decreasing the frequency of the effect. Such a determination may be made instead with respect to the time taken for the pressure applied by the object to increase from an initial pressure to a maximum pressure and return to approximately the initial pressure (e.g., within +/−1 or 2%). In some examples, the magnitude of the ESF effect may be increased to determine an impact on the responsiveness of the surface of the object to increased magnitude while maintaining a constant frequency. In some examples, multiple parameters may be adjusted, such as magnitude and frequency, such as based on the characteristics discussed above and with respect to the method 300 of FIG. 3, as well as other portions of this disclosure.

In some cases, the desired response of the surface of the object 130 may not be a maximal range of motion, or a maximal change in pressure. Instead, a desired range of motion, change in pressure, or other response may be provided and the system 100 may then adjust the ESF effect parameter to elicit a response that better matches the desired response, e.g., a particular range or type of motion.

Further, in some examples, different ESF parameters may be employed based on whether the object is contacting a surface or not contacting the surface. For example, one set of ESF parameters may be established for ESF effects to be applied to an object positioned above a surface, such as shown in FIG. 1A. Such parameters may be adjusted based on a responsiveness of the object to an ESF effect while the object is not in contact with the surface. Similarly, a second set of ESF parameters may be established for ESF effects to be applied to an object that is in contact with a surface, such as shown in FIG. 8A. Such parameters may be adjusted based on a responsiveness of the object to an ESF effect while the object is in contact with the surface, such as based on changes in pressure (or pseudo-pressure), or rates of changes in pressure (or pseudo-pressure), as discussed above.

Further, in some examples, an ESF parameter for one or more ESF effects to be applied to an object that is not in contact with a surface may be adjusted based on a responsiveness of the object while it is in contact with the surface. For example, the system 100 may treat a responsiveness of an object while in contact with the surface as if the responsiveness were of the object while not in contact with the surface, and adjust either or both sets of parameters accordingly. Or, the system 100 may treat a responsiveness of an object while not in contact with the surface as if the responsiveness were of the object while in contact with the surface, and adjust either or both sets of parameters accordingly. One such example may be employed to initially make coarse adjustments of ESF parameters for a new user, and at a later time, make finer adjustments of one set of parameters or the other only based on the corresponding mode of actuation, e.g., only adjust contact-based ESF parameters based on measurements made while an object is in contact with the surface.

At block 650, the system 100 outputs a signal to the ESF haptic output device to cause the ESF output device to output an ESF effect to the surface 110 based on the adjusted parameter(s) as discussed above with respect to block 310 of the method 300 of FIG. 3. The method then may return to block 620 to further determine responsiveness of the surface of the object or adjust the ESF effect.

It should be noted that examples according to the method 600 of FIG. 6 may be used to tune haptic effects in real-time as a user experiences the effect while using a device, such as a smartphone. For example, an application executed by a device according to this disclosure may cause a haptic effect to be output, but may perform the example method 600 of FIG. 6 to adjust a frequency of the haptic effect based on the responsiveness of the skin on the user's fingertip. For example, the skin may have different responsiveness based on whether it is cold or hot, wet or dry, dehydrated or not, clean or dirty, etc. Thus, while a model of the user's skin may provide a baseline in some examples, a frequency initially selected for the effect may be tuned based on the actual responsiveness of the skin on the user's fingertip, rather than simply using a model of the skin.

Figure 7A:
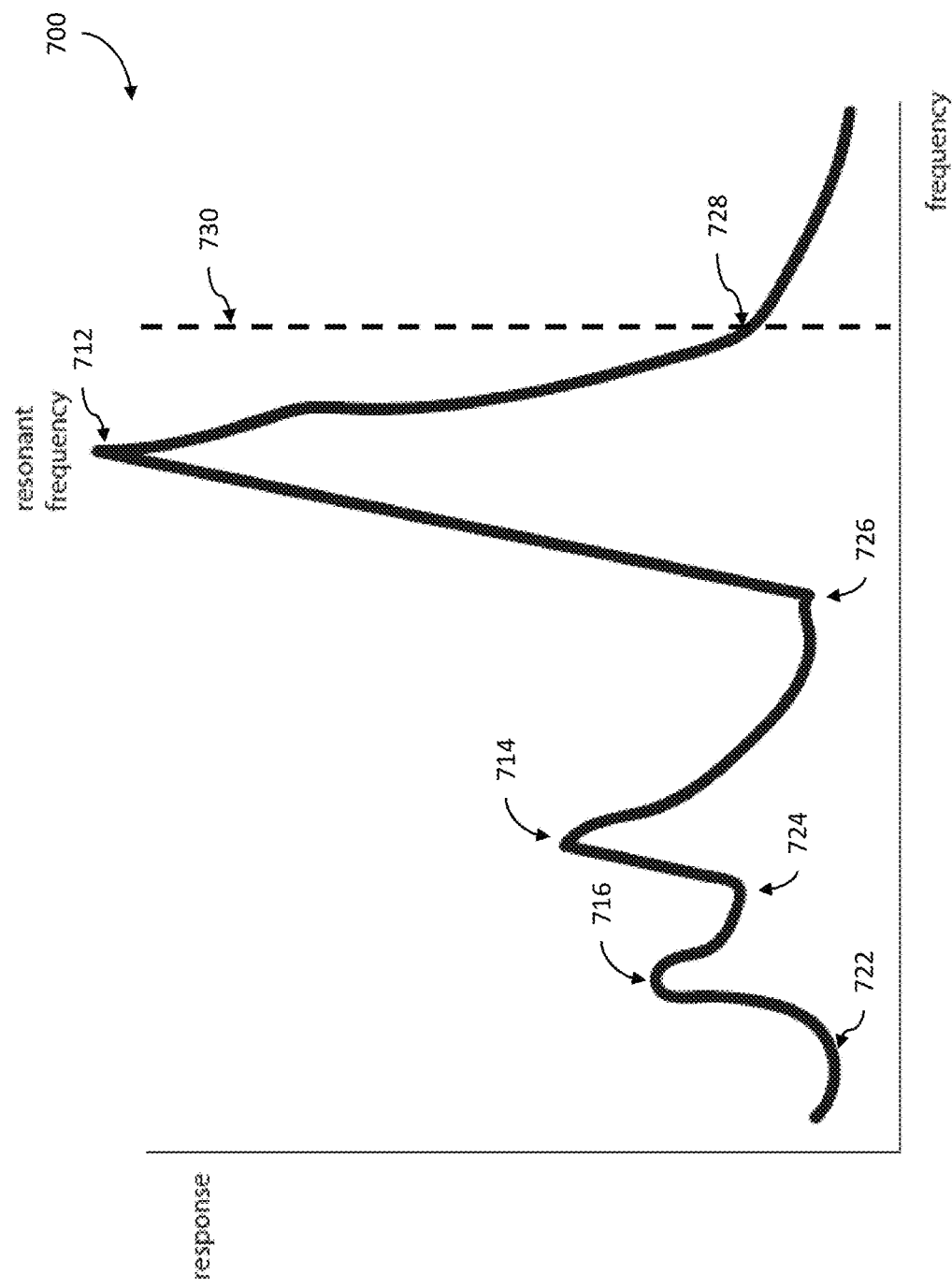
FIG. 7A shows an example frequency response of a surface of an object over a period of time.
Figures 7B, 7C:
FIGS. 7B-7C show example frequency response models of a surface of an object.

Some examples according to the method 600 of FIG. 6 may apply a frequency sweep to characterize a fingertip of a user over a range of frequencies for subsequent use when outputting haptic effects. In one example, the device may ask the user to hold her fingertip over the surface while one or more frequency sweep is performed to train the device for the user. A model may be developed for the user based on the results of the method and, in some examples, may be associated with a user profile that may be activated when the user logs into the device, or is otherwise recognized by the device. For example, FIG. 7A illustrates a plot of a response of a surface of an object 130 with respect to a frequency of an ESF effect, while FIGS. 7B and 7C show example models 750, 760 of the skin on the user's fingertip based on its response at a particular frequency. In this example, the models 750, 760 include records indicating the applied frequency and a response of the skin on the user's fingertip to the applied effect, such as information regarding whether the response at a particular frequency was a maximum or minimum, whether the maximum or minimum was a local or global value for the frequency range, or the maximum displacement of the skin on the user's fingertip for at the applied frequency. Such information may be employed to output stronger or weaker effects according to different examples.

In addition, the method 600 of FIG. 6 may be employed with other types of haptic output devices, such as ultrasound-based haptic output devices, haptic output devices that output one or more puffs of air, etc.

Figure 9A:
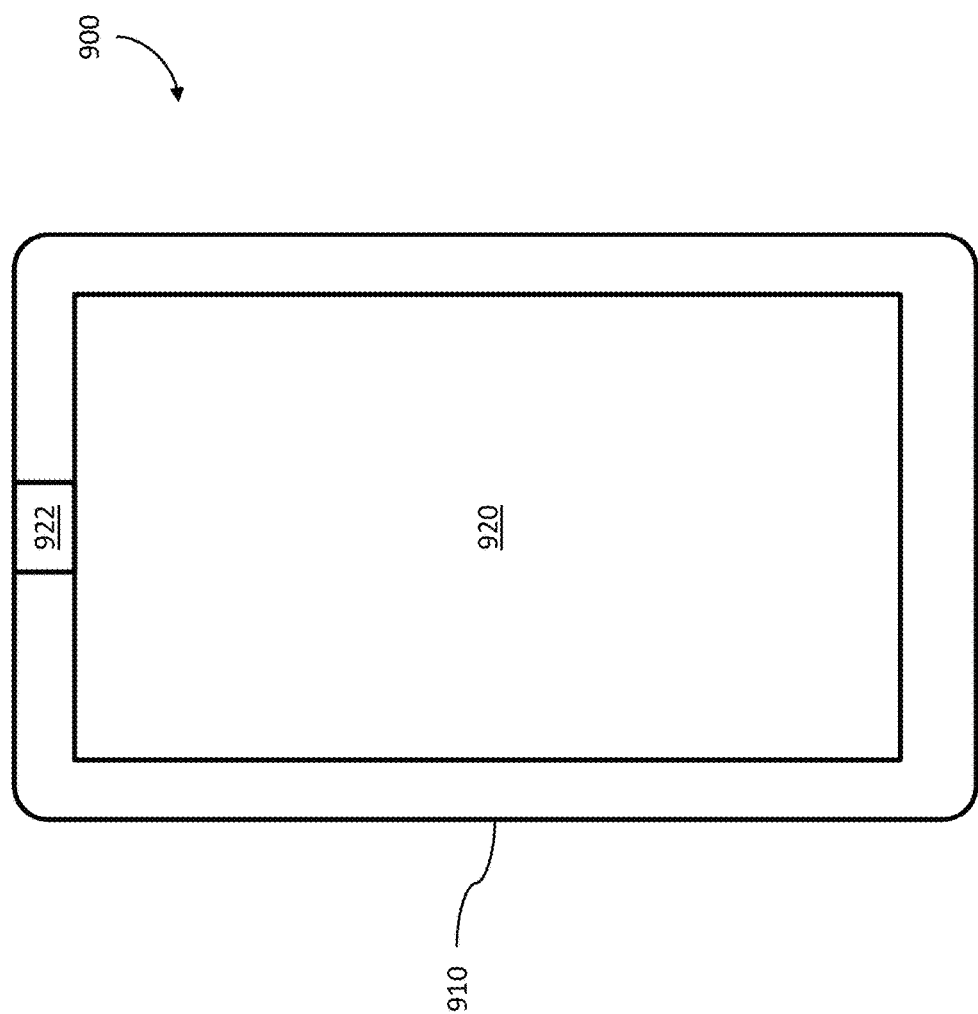
Figure 9B:
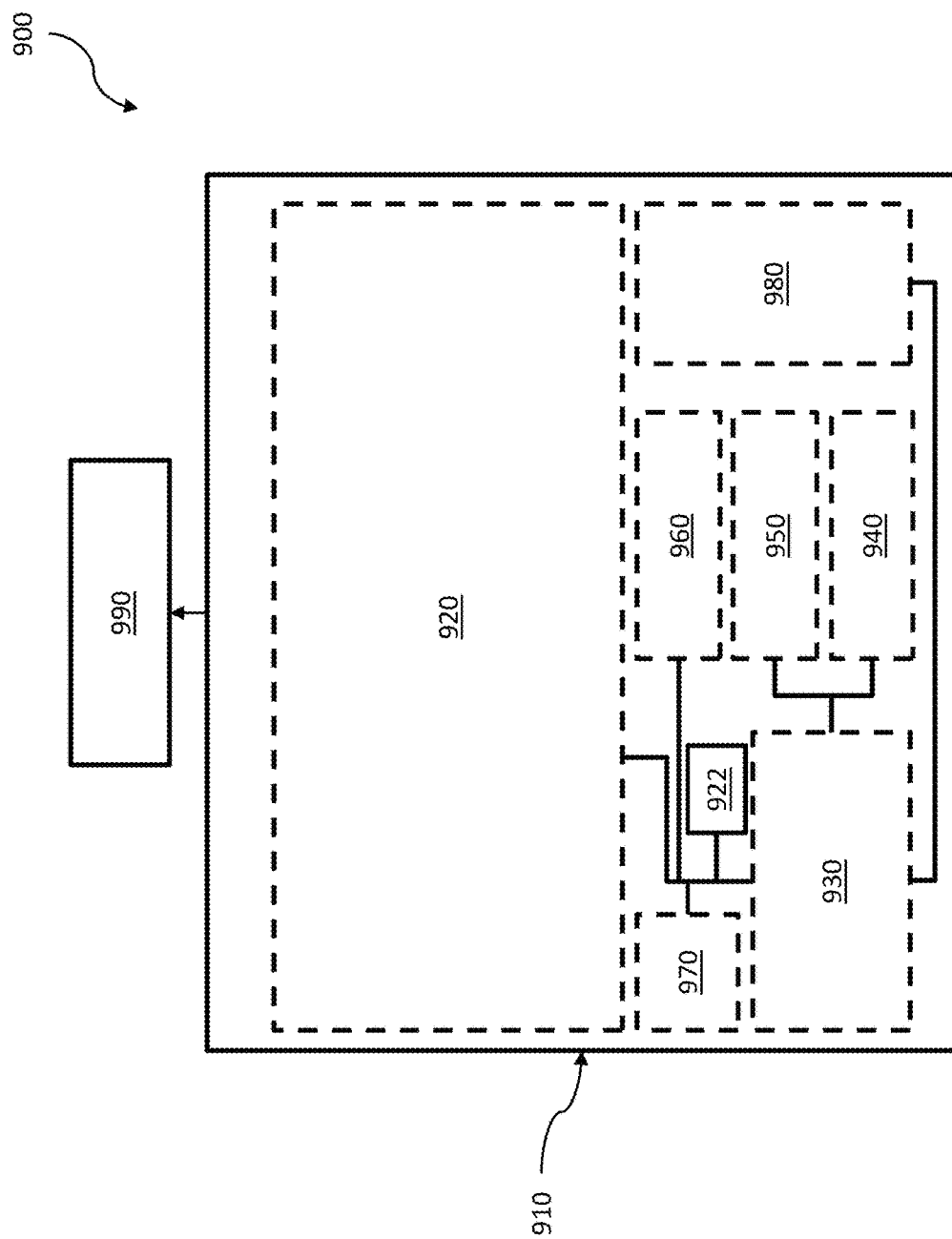

Referring now to FIGS. 9A and 9B, FIGS. 9A and 9B illustrate an example device 900 for closed-loop control for haptic feedback. In the example shown in FIG. 9A, the device includes a tablet 900 that has a touch-sensitive display screen 920 and a haptic output device (not shown) that is capable of outputting vibrational effects to the tablet's housing. In addition, the device 900 includes a sensor 922 configured to detect a distance between a surface of an object and the touch-sensitive display screen 920. For example, the sensor 922 may comprise one or more image sensors oriented to capture one or more images along the surface of the touch-sensitive display screen. In some examples, the sensor 922 may comprise one or more event-based cameras configured to detect movement of a surface of an object as it moves towards and away from the touch-sensitive display screen 920. In some examples, the sensor 922 may comprise a proximity sensor, such as an ultrasound, capacitive, ultraviolet, or visible-light sensor. In some examples, as discussed above, the sensor 922 may comprise a pressure sensor or a pseudo-pressure sensor.

Referring now to FIG. 9B, FIG. 9B shows an example device for closed-loop control for haptic feedback. In the example shown in FIG. 9B, the device 900 comprises a housing 910, a processor 930, a memory 960, a touch-sensitive display 920, a haptic output device 940, one or more sensors 950, one or more communication interfaces 980, and one or more speakers 970. In addition, the device 900 is in communication with haptic output device 990, which may be optionally coupled to or incorporated into some embodiments. The processor 930 is in communication with the memory 960 and, in this example, both the processor 930 and the memory 960 are disposed within the housing 910. The touch-sensitive display 920, which comprises or is in communication with a touch-sensitive surface, is partially disposed within the housing 910 such that at least a portion of the touch-sensitive display 920 is exposed to a user of the device 900. In some embodiments, the touch-sensitive display 920 may not be disposed within the housing 910. For example, the device 900 may be connected to or otherwise in communication with a touch-sensitive display 920 disposed within a separate housing. In some example, the housing 910 may comprise two housings that may be slidably coupled to each other, pivotably coupled to each other or releasably coupled to each other.

In the example shown in FIG. 9B, the touch-sensitive display 920 is in communication with the processor 930 and is configured to provide signals to the processor 930 or the memory 960 and to receive signals from the processor 930 or memory 960. The memory 960 is configured to store program code or data, or both, for use by the processor 930, which is configured to execute program code stored in memory 960 and to transmit signals to and receive signals from the touch-sensitive display 920. In the example shown in FIG. 9B, the processor 930 is also in communication with the communication interface 980 and is configured to receive signals from the communication interface 980 and to output signals to the communication interface 980 to communicate with other components or devices such as one or more remote computers or servers. In addition, the processor 930 is in communication with haptic output device 940 and haptic output device 990, and is further configured to output signals to cause haptic output device 940 or haptic output device 990, or both, to output one or more haptic effects. Furthermore, the processor 930 is in communication with speaker 970 and is configured to output signals to cause speaker 970 to output sounds. In various embodiments, the device 900 may comprise or be in communication with fewer or additional components or devices. For example, other user input devices such as a mouse or a keyboard, or both, or an additional touch-sensitive device may be comprised within the device 900 or be in communication with the device 900. As another example, device 900 may comprise and/or be in communication with one or more accelerometers, gyroscopes, digital compasses, and/or other sensors. A detailed description of the components of the device 900 shown in FIG. 9B and components that may be in association with the device 900 are described herein.

The device 900 can be any device that is capable of receiving user input and executing software applications. For example, the device 900 in FIG. 9B includes a touch-sensitive display 920 that comprises a touch-sensitive surface. In some embodiments, a touch-sensitive surface may be overlaid on the touch-sensitive display 920. In other embodiments, the device 900 may comprise or be in communication with a display and a separate touch-sensitive surface. In still other embodiments, the device 900 may comprise or be in communication with a display and may comprise or be in communication with other user input devices, such as a mouse, a keyboard, buttons, knobs, slider controls, switches, wheels, rollers, joysticks, other manipulanda, or a combination thereof.

In some embodiments, one or more touch-sensitive surfaces may be included on or disposed within one or more sides of the device 900. For example, in one example, a touch-sensitive surface is disposed within or comprises a rear surface of the device 900. In another example, a first touch-sensitive surface is disposed within or comprises a rear surface of the device 900 and a second touch-sensitive surface is disposed within or comprises a side surface of the device 900. In some embodiments, the system may comprise two or more housing components, such as in a clamshell arrangement or in a slidable arrangement. For example, one example comprises a system having a clamshell configuration with a touch-sensitive display disposed in each of the portions of the clamshell. Furthermore, in examples where the device 900 comprises at least one touch-sensitive surface on one or more sides of the device 900 or in examples where the device 900 is in communication with an external touch-sensitive surface, the display 920 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the device 900 may comprise both flexible and rigid touch-sensitive surfaces.

In various embodiments, the device 900 may comprise or be in communication with fewer or additional components than the example shown in FIG. 9B. For example, in one example, the device 900 does not comprise a speaker 970. In another example, the device 900 does not comprise a touch-sensitive display 920, but comprises a touch-sensitive surface and is in communication with a display. Thus, in various embodiments, the device 900 may comprise or be in communication with any number of components, such as in the various examples disclosed herein as well as variations that would be apparent to one of skill in the art.

The housing 910 of the device 900 shown in FIG. 9B provides protection for at least some of the components of device 900. For example, the housing 910 may be a plastic casing that protects the processor 930 and memory 960 from environmental conditions, such as rain, dust, etc. In some embodiments, the housing 910 protects the components in the housing 910 from damage if the device 900 is dropped by a user. The housing 910 can be made of any suitable material including but not limited to plastics, rubbers, or metals. Various examples may comprise different types of housings or a plurality of housings. For example, in some embodiments, the device 900 may be a portable device, handheld device, toy, gaming console, handheld video game system, gamepad, game controller, desktop computer, e-book reader, portable multifunction device such as a cell phone, smartphone, personal digital assistant (PDA), laptop, tablet computer, digital music player, etc.

In some examples, the device 900 may be embedded in another device such as a wrist watch, a virtual-reality headset, other jewelry, such as bracelets, wristbands, rings, earrings, necklaces, etc., gloves, eyeglasses, augmented-reality ("AR") devices, such as AR headsets, or other wearable device. Thus, in some examples, the device 900 is wearable. In one example, the device 900, such as a wearable device, does not comprise a display screen, but instead may comprise one or more notification mechanisms, such as one or more lights, such as one or more individual LEDs, one or more haptic output devices, one or more speakers, etc. Such a device 900 may be configured to generate one or more notifications to a user using one or more such notification mechanisms.

In the example shown in FIG. 9B, the touch-sensitive display 920 provides a mechanism to allow a user to interact with the device 900. For example, the touch-sensitive display 920 detects the location or pressure, or both, of a user's finger in response to a user hovering over, touching, or pressing the touch-sensitive display 920 (all of which may be referred to as a contact in this disclosure). In one example, a contact can occur through the use of a camera. For example, a camera may be used to track a viewer's eye movements as the user views the content displayed on the display 920 of the device 900, or the user's eye movements may be used to transmit commands to the device, such as to turn a page or to highlight a portion of text. In this example, haptic effects may be triggered based at least in part on the viewer's eye movements. For example, a haptic effect may be output when a determination is made that the viewer is viewing content at a particular location of the display 920. In some embodiments, the touch-sensitive display 920 may comprise, be connected with, or otherwise be in communication with one or more sensors that determine the location, pressure, size of a contact patch, or any of these, of one or more contacts on the touch-sensitive display 920.

In some embodiments, the touch-sensitive display 920 may comprise a multi-touch touch-sensitive display that is capable of sensing and providing information relating to a plurality of simultaneous contacts. For example, in one example, the touch-sensitive display 920 comprises or is in communication with a mutual capacitance system. Some examples may have the ability to sense pressure or pseudo-pressure and may provide information to the processor associated with a sensed pressure or pseudo-pressure at one or more contact locations. In another example, the touch-sensitive display 920 comprises or is in communication with an absolute capacitance system. In some embodiments, the touch-sensitive display 920 may comprise or be in communication with a resistive panel, a capacitive panel, infrared LEDs, photodetectors, image sensors, optical cameras, or a combination thereof. Thus, the touch-sensitive display 920 may incorporate any suitable technology to determine a contact on a touch-sensitive surface such as, for example, resistive, capacitive, infrared, optical, thermal, dispersive signal, or acoustic pulse technologies, or a combination thereof.

In the example shown in FIG. 9B, haptic output device 940 and haptic output device 990 are in communication with the processor 930 and are configured to provide one or more haptic effects. For example, in one example, when an actuation signal is provided to haptic output device 940, haptic output device 990, or both, by the processor 930, the respective haptic output device(s) 940, 990 outputs a haptic effect based on the actuation signal. For example, in the example shown, the processor 930 is configured to transmit a haptic output signal to haptic output device 940 comprising an analog drive signal. In some embodiments, the processor 930 is configured to transmit a high-level command to haptic output device 990, wherein the command includes a command identifier and zero or more parameters to be used to generate an appropriate drive signal to cause the haptic output device 990 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output device 990, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a shape memory alloy, a pager, a DC motor, an AC motor, a moving magnet actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various examples may include a single or multiple haptic output devices and may have the same type or a combination of different types of haptic output devices.

In other embodiments, deformation of one or more components can be used to produce a haptic effect. For example, one or more haptic effects may be output to change the shape of a surface or a coefficient of friction of a surface. In an example, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some examples comprising haptic output devices, such as haptic output device 990, that are capable of generating frictional or deformation effects, the haptic output device may be overlaid on the touch-sensitive display or otherwise coupled to the touch-sensitive display 920 such that the frictional or deformation effects may be applied to a touch-sensitive surface that is configured to be touched by a user. In some embodiments, other portions of the system may provide such forces, such as portions of the housing that may be contacted by the user or in a separate touch-separate input device coupled to the system. Co-pending U.S. patent application Ser. No. 13/092,484, filed Apr. 22, 2011, entitled "Systems and Methods for Providing Haptic Effects," the entirety of which is hereby incorporated by reference, describes ways that one or more haptic effects can be produced and describes various haptic output devices.

It will be recognized that any type of input synthesis method may be used to generate the interaction parameter from one or more haptic effect signals including, but not limited to, the method of synthesis examples listed in TABLE 1 below.

TABLE 1

| METHODS OF SYNTHESIS | |
|---|---|
| Synthesis Method | Description |
| Additive synthesis | combining inputs, typically of varying amplitudes |
| Subtractive synthesis | filtering of complex signals or multiple signal inputs |
| Frequency modulation synthesis | modulating a carrier wave signal with one or more operators |
| Sampling | using recorded inputs as input sources subject to modification |
| Composite synthesis | using artificial and sampled inputs to establish a resultant "new" input |
| Phase distortion | altering the speed of waveforms stored in wavetables during playback |
| Waveshaping | intentional distortion of a signal to produce a modified result |
| Resynthesis | modification of digitally sampled inputs before playback |
| Granular synthesis | combining of several small input segments into a new input |
| Linear predictive coding | similar technique as used for speech synthesis |
| Direct digital synthesis | computer modification of generated waveforms |
| Wave sequencing | linear combinations of several small segments to create a new input |
| Vector synthesis | technique for fading between any number of different input sources |
| Physical modeling | mathematical equations of the physical characteristics of virtual motion |

In the example device in FIG. 9B, the sensor 950 is configured to generate one or more sensor signals that may be used to determine a location of the device 900. For example, the sensor 950 may comprise a GPS receiver. In some examples, the sensor 950 may be a WiFi component that is capable of receiving WiFi signals and providing those signals to the processor 930. In some examples, the sensor 950 may be one or more accelerometers or gyroscopes configured to detect a movement of the device 900.

In the example device in FIG. 9B, the communication interface 980 is in communication with the processor 930 and provides wired or wireless communications from the device 900 to other components or other devices. For example, the communication interface 980 may provide wireless communications between the device 900 and a communications network. In some embodiments, the communication interface 980 may provide communications to one or more other devices, such as another device 900 and/or one or more other devices. The communication interface 980 can be any component or collection of components that enables the device 900 to communicate with another component, device, or network. For example, the communication interface 980 may comprise a PCI communication adapter, a USB network adapter, or an Ethernet adapter. The communication interface 980 may communicate using wireless Ethernet, including 802.11 a, g, b, or n standards. In one example, the communication interface 980 can communicate using Radio Frequency (RF), Bluetooth, CDMA, TDMA, FDMA, GSM, Wi-Fi, satellite, or other cellular or wireless technology. In other embodiments, the communication interface 980 may communicate through a wired connection and may be in communication with one or more networks, such as Ethernet, token ring, USB, FireWire 1394, fiber optic, etc. In some embodiments, device 900 comprises a single communication interface 980. In other embodiments, device 900 comprises two, three, four, or more communication interfaces.

Referring now to FIG. 10, FIG. 10 shows an example device 1000 for closed-loop control for haptic feedback. The example device 1000 comprises a surface 1010, a output device 1020, and proximity sensor 1030 overlaid on the surface. In this example, the proximity sensor 1030 comprises a capacitive proximity sensor. In this example, the device 1000 is configured to output ESF effects to the surface 1010 and to determine movement of a surface of an object 1040 as the surface of the object 1040 responds to the ESF effects. As discussed above, the surface of the object 1040 may be attracted towards the surface 1010 while an ESF effect is applied. As the surface of the object 1040 moves in response to an ESF effect, the proximity sensor 1030 may provide sensor signals to a processor (not shown), which may determine characteristics of the surface of the object, such as velocities, displacements, positions, accelerations, etc., in response to an ESF effect.

While the device 1000 of FIG. 10 comprises a capacitive proximity sensor 1030, any suitable proximity sensor may be employed. In some examples, the device 1000 (or other devices or systems according to this disclosure) may comprise a dedicated surface region where haptic effects may be applied. In some such examples, an image sensor may be positioned beneath the surface region and oriented to capture images of the surface of the object as a haptic effect is applied and may determine characteristics of the surface of the object based on changes in shape, reflectance, or other visual characteristics of the surface of the object. In some examples, rather than (or in addition to) an image sensor, a laser vibrometer may be employed to detect characteristics of the surface of the object 1040 based on reflected laser light.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:
   outputting a first signal configured to cause a haptic output device to output a haptic effect to a surface;
   determining one or more first characteristics of a surface of an object responding to the haptic effect;
   in response to the first characteristics reaching a first threshold, discontinuing output of the first signal;
   determining one or more second characteristics of the surface of the object responding to the discontinuing output of the first signal;
   in response to the second characteristics reaching a second threshold, determining a responsiveness of the surface of the object to the haptic effect; and
   outputting a second signal based on the responsiveness, the second signal configured to cause the haptic output device to output a second haptic effect to the surface.

2. The method of claim 1, further comprising iteratively performing the steps of outputting the first signal, determining the first characteristics, discontinuing output of the first signal, and determining the second characteristics to determine an approximate resonant frequency of the surface of the object.

3. The method of claim 1, wherein the haptic output device comprises an electrostatic friction (ESF) haptic output device, and wherein the haptic effect comprises an ESF haptic effect.

4. The method of claim 1, further comprising iteratively performing the steps of outputting the first signal, determining the first characteristics, discontinuing output of the first signal, and determining the second characteristics to generate a frequency response model of the surface of the object.

5. The method of claim 4, further comprising generating and outputting a third haptic effect, the third haptic effect based on the frequency response model of the surface of the object.

6. The method of claim 1, wherein determining the first and second characteristics are based on images from an image sensor.

7. The method of claim 1, wherein determining the first and second characteristics are based on sensor signals from one or more proximity sensors.

8. The method of claim 1, wherein determining the first and second characteristics are based on sensor signals from one or more pressure sensors.

9. A device comprising:
a surface;
a sensor;
a haptic output device in communication with the surface;
a processor in communication with the output device and the sensor, the processor configured to:
output a first signal to the haptic output device, the first signal configured to cause the haptic output device to output a haptic effect to the surface;
determine first characteristics of a surface of an object responding to the haptic effect based on one or more first sensor signals received from the sensor;
in response to the characteristics reaching a first threshold, discontinue output of the first signal;
determine second characteristics of the surface of the object responding to the discontinuing of the first signal based on one or more second sensor signals received from the sensor;
in response to the second characteristics reaching a second threshold, determine a responsiveness of the surface of the object to the haptic effect;
adjust a haptic effect parameter based on the responsiveness; and
output a second signal to the haptic output device based on the responsiveness, the second signal configured to cause the haptic output device to output a second haptic effect to the surface.

10. The device of claim 9, wherein the processor is further configured to iteratively output the first signal, determine the first characteristics, discontinue output of the first signal, and determine the second characteristics to determine an approximate resonant frequency of the surface of the object.

11. The device of claim 9, wherein the haptic output device comprises an electrostatic friction (ESF) haptic output device, and wherein the haptic effect comprises an ESF haptic effect.

12. The device of claim 9, wherein the processor is further configured to iteratively output the first signal, determine the first characteristics, discontinue output of the first signal, and determine the second characteristics to generate a frequency response model of the surface of the object.

13. The device of claim 12, wherein the processor is further configured to generate and output a third haptic effect, the third haptic effect based on the frequency response model of the surface of the object.

14. The device of claim 9, wherein the sensor comprises an image sensor.

15. The device of claim 9, wherein the sensor comprises a proximity sensor.

16. The device of claim 9, wherein the sensor comprises a pressure sensor.

17. A non-transitory computer-readable medium comprising processor-executable program code, the program code configured to cause a processor to:
output a first signal to a output device, the first signal configured to cause a haptic output device to output a haptic effect to a surface;
determine one or more first characteristics of a surface of an object responding to the haptic effect;
in response to the first characteristics reaching a first threshold, discontinue output of the first signal;
determine one or more second characteristics of the surface of the object responding to the discontinuing of the first signal;
in response to the second characteristics reaching a second threshold, determine a responsiveness of the surface of the object to the haptic effect;
adjust a haptic effect parameter based on the responsiveness; and
output a second signal to the haptic output device based on the responsiveness, the second signal configured to cause the haptic output device to output a second haptic effect to the surface.

18. The non-transitory computer-readable medium of claim 17, wherein the program code is further configured to cause the processor to iteratively output the first signal, determine the first characteristics, discontinue output of the first signal, and determine the second characteristics to determine an approximate resonant frequency of the surface of the object.

19. The non-transitory computer-readable medium of claim 17, wherein the haptic output device comprises an electrostatic friction (ESF) haptic output device, and wherein the haptic effect comprises an ESF haptic effect.

20. The non-transitory computer-readable medium of claim 17, wherein the program code is further configured to cause the processor to iteratively output the first signal, determine the first characteristics, discontinue output of the first signal, and determine the second characteristics to generate a frequency response model of the surface of the object.

21. The non-transitory computer-readable medium of claim 20, wherein the program code is further configured to cause the processor to generate and output a third haptic effect, the third haptic effect based on the frequency response model of the surface of the object.

22. The non-transitory computer-readable medium of claim 17, wherein the program code is further configured to cause the processor to determine the first and second characteristics based on images from an image sensor.

23. The non-transitory computer-readable medium of claim 17, wherein the program code is further configured to cause the processor to determine the first and second characteristics based on sensor signals from one or more proximity sensors.

24. The non-transitory computer-readable medium of claim 17, wherein the program code is further configured to cause the processor to determine the first and second characteristics based on sensor signals from one or more pressure sensors.

* * * * *